United States Patent
Kim et al.

(10) Patent No.: US 10,597,581 B2
(45) Date of Patent: *Mar. 24, 2020

(54) COLOR CONVERSION FILM, PRODUCTION METHOD FOR SAME, AND BACKLIGHT UNIT AND DISPLAY DEVICE COMPRISING SAME

(71) Applicant: LG CHEM, LTD., Seoul (KR)

(72) Inventors: Nari Kim, Daejeon (KR); Sehwan Son, Daejeon (KR); Dong Mok Shin, Daejeon (KR); Ji Ho Kim, Daejeon (KR); Joo Yeon Seo, Daejeon (KR); Byeong In Ahn, Daejeon (KR); Du Hyeon Shin, Daejeon (KR)

(73) Assignee: LG CHEM, LTD., Seoul (KR)

( * ) Notice: Subject to any disclaimer, the term of this patent is extended or adjusted under 35 U.S.C. 154(b) by 475 days.

This patent is subject to a terminal disclaimer.

(21) Appl. No.: 15/504,567

(22) PCT Filed: Feb. 1, 2016

(86) PCT No.: PCT/KR2016/001089
§ 371 (c)(1),
(2) Date: Feb. 16, 2017

(87) PCT Pub. No.: WO2016/122285
PCT Pub. Date: Aug. 4, 2016

(65) Prior Publication Data
US 2017/0247610 A1    Aug. 31, 2017

(30) Foreign Application Priority Data

Jan. 31, 2015  (KR) .................. 10-2015-0015701

(51) Int. Cl.
*C09K 11/06* (2006.01)
*C09K 11/02* (2006.01)
(Continued)

(52) U.S. Cl.
CPC ...... *C09K 11/025* (2013.01); *B29D 11/00634* (2013.01); *B82Y 30/00* (2013.01);
(Continued)

(58) Field of Classification Search
CPC ....... C09K 11/06; C09K 11/02; C09K 11/025; C09K 2211/1022; C09K 2211/1007;
(Continued)

(56) References Cited

U.S. PATENT DOCUMENTS 10,131,836 B2 * 11/2018 Shin ................. C09K 11/06
2003/0082406 A1   5/2003 Murase et al.
(Continued)

FOREIGN PATENT DOCUMENTS

CN    101529320 A    9/2009
JP    2000-230172 A   8/2000
(Continued)

OTHER PUBLICATIONS

Machine translation of JP-2009023914-A, 72 pages. (Year: 2009).*

*Primary Examiner* — Matthew E. Hoban
*Assistant Examiner* — Lynne Edmondson
(74) *Attorney, Agent, or Firm* — Dentons US LLP

(57) ABSTRACT

The invention described in the present specification relates to a color conversion film including a resin matrix; and an organic fluorescent substance dispersed in the resin matrix, wherein the organic fluorescent substance includes a green fluorescent substance having a maximum light emission wavelength in a 510 nm to 560 nm range when irradiating light including a 450 nm wavelength, and a red fluorescent substance having a maximum light emission wavelength in a 600 nm to 660 nm range when irradiating light including a 450 nm wavelength, the green fluorescent substance and the red fluorescent substance have a molar ratio of 5:1 to 50:1, and the color conversion film has a light emission peak
(Continued)

with a full width at half maximum (FWHM) of 50 nm or less in a 510 nm to 560 nm range and a light emission peak with a FWHM of 90 nm or less in a 600 nm to 660 nm range when irradiating light, a method for preparing the same, and a backlight unit including the color conversion film.

11 Claims, 6 Drawing Sheets

(51) Int. Cl.
  *C09D 5/22* (2006.01)
  *C09D 125/06* (2006.01)
  *F21V 8/00* (2006.01)
  *B82Y 30/00* (2011.01)
  *C08J 7/04* (2020.01)
  *B29D 11/00* (2006.01)
  *C08K 5/55* (2006.01)
  *G02F 1/1335* (2006.01)
  *B05D 5/06* (2006.01)

(52) U.S. Cl.
  CPC ............... *C08J 7/047* (2013.01); *C08K 5/55* (2013.01); *C09D 5/22* (2013.01); *C09D 125/06* (2013.01); *C09K 11/06* (2013.01); *G02B 6/005* (2013.01); *B05D 5/065* (2013.01); *B29K 2995/0018* (2013.01); *C08J 2367/02* (2013.01); *C08J 2425/06* (2013.01); *C08K 2201/014* (2013.01); *C09K 2211/1007* (2013.01); *C09K 2211/1022* (2013.01); *C09K 2211/1029* (2013.01); *G02B 6/0031* (2013.01); *G02B 6/0055* (2013.01); *G02F 1/133615* (2013.01); *G02F 2001/133614* (2013.01); *G02F 2202/36* (2013.01)

(58) Field of Classification Search
  CPC ............ C09K 2211/1029; C09K 19/38; G02B 6/005; G02B 6/0055; G02B 6/0073; C09D 125/06; C09D 5/22
  USPC .......................... 252/301.36, 301.16; 427/65
  See application file for complete search history.

(56) References Cited

U.S. PATENT DOCUMENTS

| | | |
|---|---|---|
| 2010/0002413 A1 | 1/2010 | Igarashi et al. |
| 2012/0229017 A1 | 9/2012 | Nagai et al. |
| 2013/0265522 A1 | 10/2013 | Jung et al. |
| 2014/0027673 A1 | 1/2014 | Nick et al. |
| 2016/0284947 A1 | 9/2016 | Koenemann et al. |

FOREIGN PATENT DOCUMENTS

| | | | |
|---|---|---|---|
| JP | 2009-23914 A | | 2/2009 |
| JP | 2009023914 A | * | 2/2009 |
| JP | 2011-241160 A | | 12/2011 |
| KR | 10-2012-0071388 A | | 7/2012 |
| KR | 10-2013-0112990 A | | 10/2013 |
| KR | 10-2014-0051214 A | | 4/2014 |
| TW | 201405886 A | | 2/2014 |

* cited by examiner

[FIG. 1]
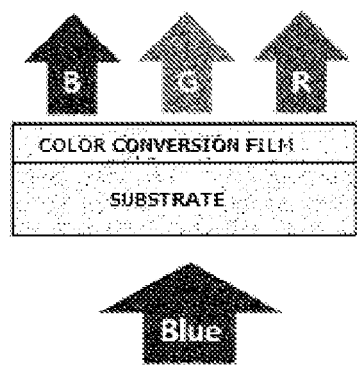
[FIG. 2]
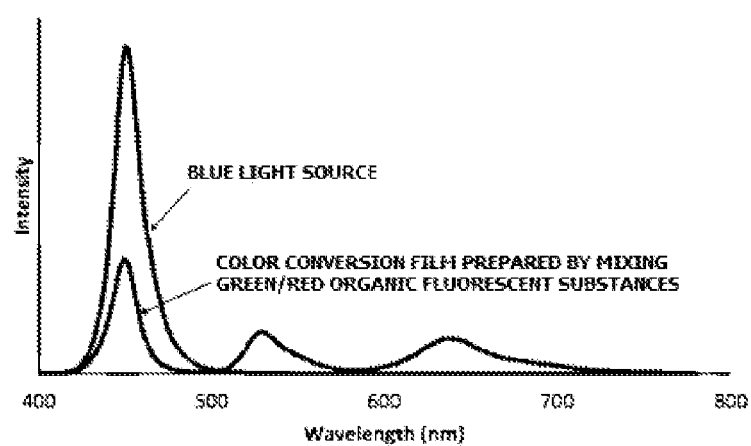

[FIG. 3]
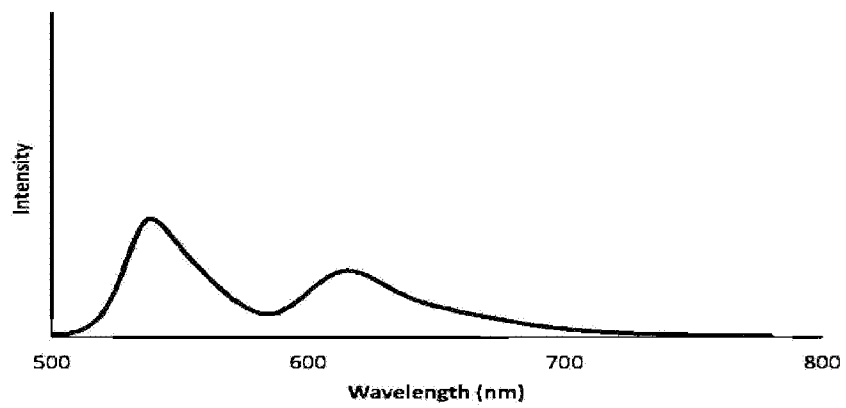
[FIG. 4]
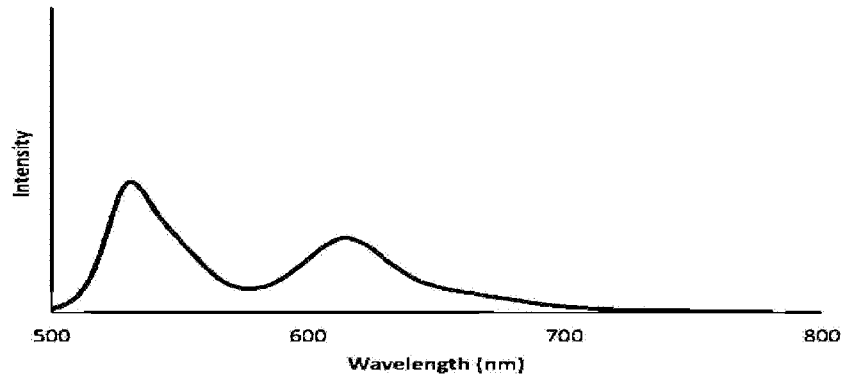

[FIG. 5]
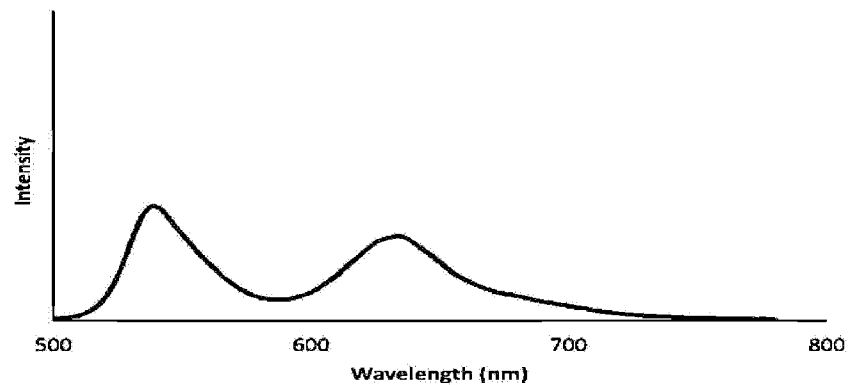
[FIG. 6]
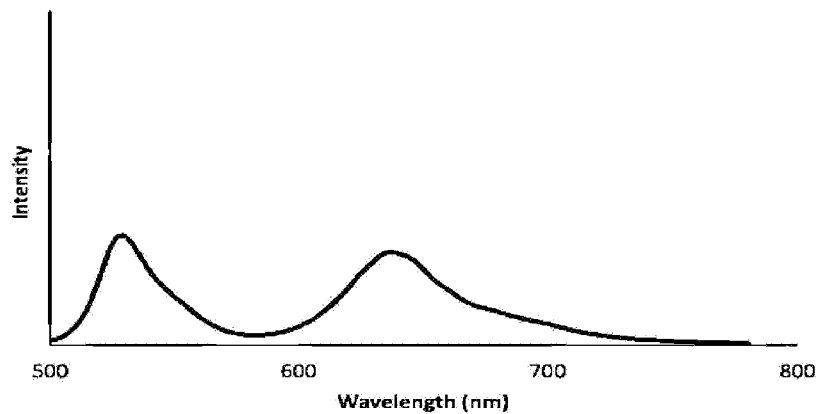
[FIG. 7]
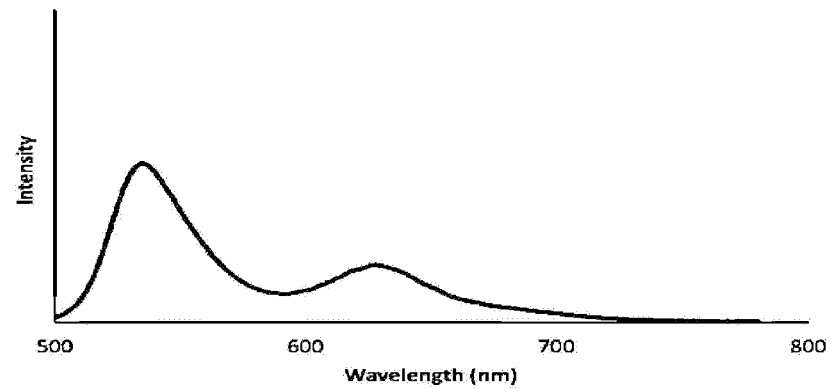

[FIG. 8]
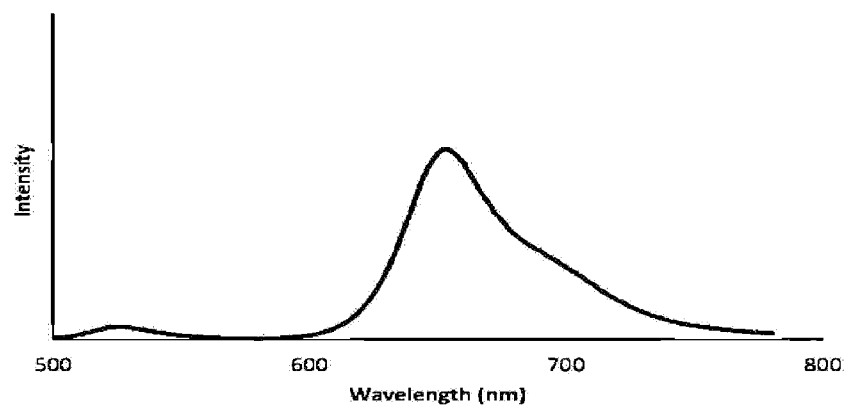
[FIG. 9]
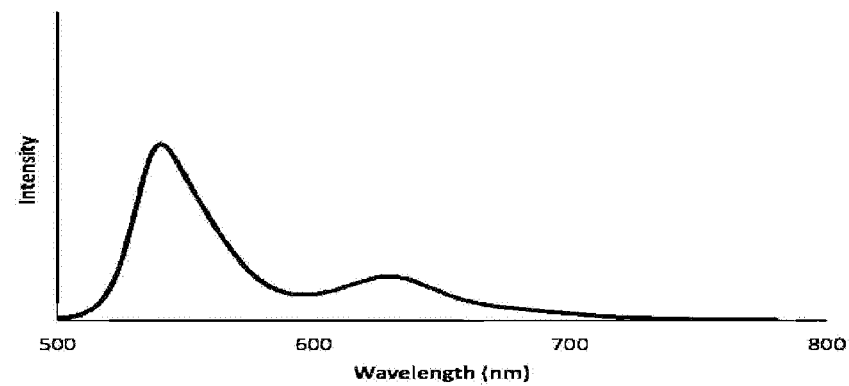

[FIG. 10]
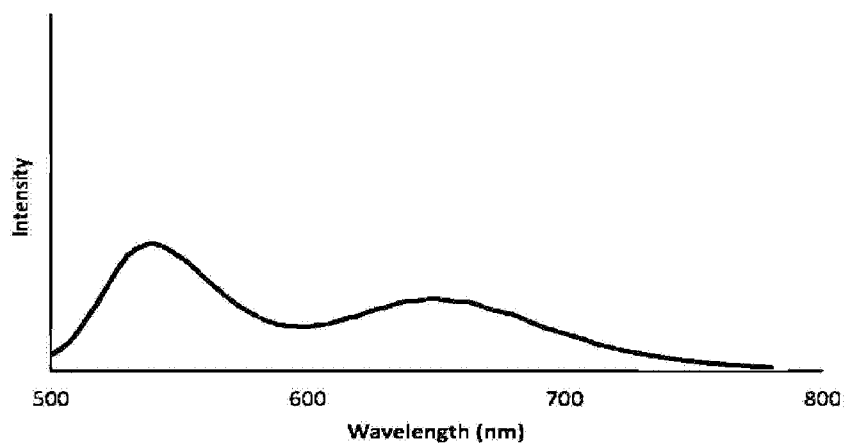
[FIG. 11]
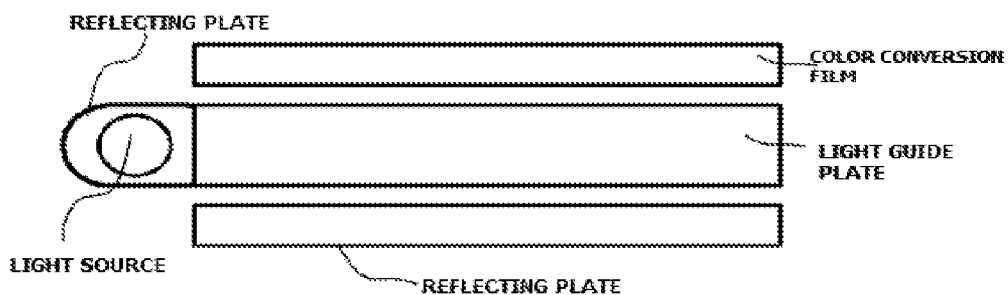

[FIG. 12]
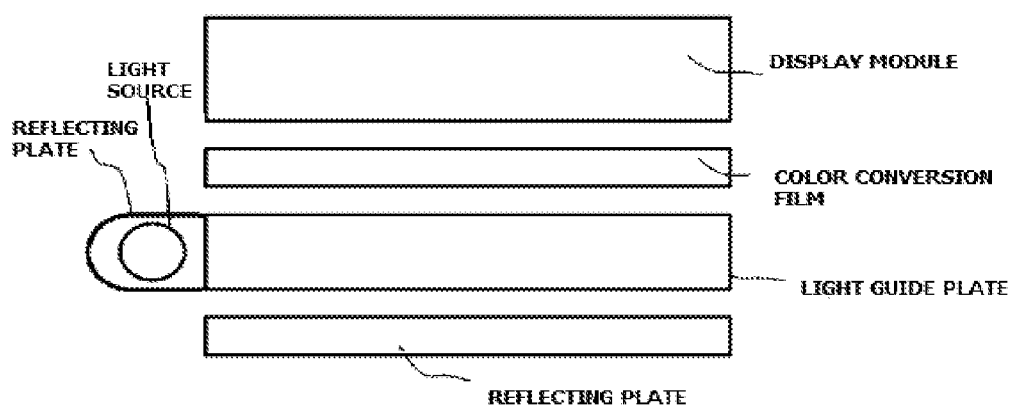

COLOR CONVERSION FILM, PRODUCTION METHOD FOR SAME, AND BACKLIGHT UNIT AND DISPLAY DEVICE COMPRISING SAME

TECHNICAL FIELD

The present application relates to a color conversion film and a backlight unit and a display apparatus including the same. This application is a National Stage Entry of International Application No. PCT/KR2016/001089, filed on Feb. 1, 2016, and claims the benefit of and priority to Korean Application No. 10-2015-0015701, filed on Jan. 31, 2015, all of which are hereby incorporated by reference in their entirety for all purposes as if fully set forth herein.

BACKGROUND ART

As large area televisions become more common, televisions are also becoming high-definition, slimmer and highly functional. High performance and high definition OLED TVs still have a problem of price competitiveness, and real markets for OLED TVs have not yet begun. Accordingly, efforts to similarly secure advantages of OLEDs with LCDs have been continuously made.

As one of the efforts, many quantum dot-related technologies and prototypes have been recently incorporated. However, cadmium-based quantum dots have safety problems such as restrictions on the use, and therefore, interests in manufacturing back lights using quantum dots without cadmium, which has relatively no safety issues, have been rising.

DISCLOSURE

Technical Problem

The present application provides a color conversion film having excellent color gamut, and a backlight unit and a display apparatus including the color conversion film.

Technical Solution

One embodiment of the present application provides a color conversion film including a resin matrix; and an organic fluorescent substance dispersed in the resin matrix, wherein the organic fluorescent substance includes a green fluorescent substance having a maximum light emission wavelength in a 510 nm to 560 nm range when irradiating light including a 450 nm wavelength, and a red fluorescent substance having a maximum light emission wavelength in a 600 nm to 660 nm range when irradiating light including a 450 nm wavelength, the green fluorescent substance and the red fluorescent substance have a molar ratio of 5:1 to 50:1, and the color conversion film has a light emission peak with a full width at half maximum (FWHM) of 50 nm or less in a 510 nm to 560 nm range and a light emission peak with a FWHM of 90 nm or less in a 600 nm to 660 nm range when irradiating light including a 450 nm wavelength.

According to one example, light having a light emission peak at a 450 nm wavelength may be used as the light including a 450 nm wavelength.

In the present specification, blue light having a maximum light emission wavelength of 450 nm, a FWHM of 40 nm or less and monomodal light emission intensity distribution may be used in order to evaluate a light emission property such as a light emission peak or a FWHM of the organic fluorescent substance or the color conversion film.

When the color conversion film does not have a light emission peak in the wavelength range described above, a white color coordinate of light emitted from the color conversion film is extremely difficult to set. In addition, high color gamut may be obtained by the color conversion film having a light emission wavelength with a specific FWHM present in the wavelength range described above.

According to the present invention, the green fluorescent substance and the red fluorescent substance are included in a single layer. This is different from a constitution laminating a layer including a green fluorescent substance and a layer including a red fluorescent substance.

Another embodiment of the present application provides a method for preparing a color conversion film including coating a resin solution in which the green fluorescent substance described above and the red fluorescent substance described above are dissolved on a substrate; and drying the resin solution coated on the substrate.

Another embodiment of the present application provides a method for preparing a color conversion film including extruding the green fluorescent substance described above and the red fluorescent substance described above with a resin.

Another embodiment of the present application provides a backlight unit including the color conversion film.

Another embodiment of the present application provides a display apparatus including the backlight unit.

Advantageous Effects

A color conversion film according to the embodiments described in the present invention includes the green fluorescent substance and the red fluorescent substance described above in the composition ratio described above, and has a light emission peak with a FWHM of 50 nm or less in a 510 nm to 560 nm range and a light emission peak with a FWHM of 90 nm or less in a 600 nm to 660 nm range when irradiating light including a 450 nm wavelength, and as a result, white color having excellent color gamut is capable of being obtained with one film. In addition, a manufacturing process is simple since the color conversion film can be prepared by coating a solution including a red fluorescent substance and a green fluorescent substance once. Furthermore, when including a red fluorescent substance and a green fluorescent substance in one film as described above, the red fluorescent substance may be used in a relatively small quantity, and accordingly, manufacturing costs may be lowered.

DESCRIPTION OF DRAWINGS

FIG. 1 is a schematic diagram illustrating a laminated structure of a color conversion film according to one embodiment of the present application.

FIG. 2 shows a light emission spectrum of a color conversion film according to one embodiment of the present application.

FIG. 3 to FIG. 10 show light emission spectra of color conversion films prepared in Examples 1 to 4 and Comparative Examples 1 to 4, respectively.

FIG. 11 is a schematic diagram using a color conversion film according to one embodiment of the present application in a backlight.

FIG. 12 is a schematic diagram illustrating a structure of a display apparatus according to one embodiment of the present application.

MODE FOR INVENTION

A color conversion film according to one embodiment of the present application includes a resin matrix; and an organic fluorescent substance dispersed in the resin matrix, wherein the organic fluorescent substance includes a green fluorescent substance having a maximum light emission wavelength in a 510 nm to 560 nm range when irradiating light including a 450 nm wavelength, and a red fluorescent substance having a maximum light emission wavelength in a 600 nm to 660 nm range when irradiating light including a 450 nm wavelength, and the green fluorescent substance and the red fluorescent substance have a molar ratio of 5:1 to 50:1.

According to the embodiment, white light is capable of being obtained by using the green fluorescent substance and the red fluorescent substance described above together with a light source including blue light, and when the green fluorescent substance and the red fluorescent substance have a maximum light emission wavelength in the range described above, high color gamut is capable of being obtained. For example, as in FIG. 2, when irradiating light having a light emission peak at 450 nm on one film, light emission peaks are obtained in blue, green and red regions, and accordingly, white color is capable of being obtained.

Particularly, by including the green fluorescent substance and the red fluorescent substance in one film, excellent light emission efficiency may be obtained even when content of the red fluorescent substance is relatively low. Specifically, when mixing the green fluorescent substance and the red fluorescent substance in the above-mentioned content range, a white color coordinate of light emitted from a color conversion film may be set by using the red fluorescent substance in a smaller quantity compared to the green fluorescent substance. A molar ratio of the fluorescent substances may be different depending on an overlap level of a light emission spectrum of the green fluorescent substance and an absorption spectrum of the red fluorescent substance used. As the overlap increases, the amount of the red fluorescent substance used may decrease in order to set a white color coordinate.

In addition, the color conversion film has a light emission peak with a FWHM of 50 nm or less in a 510 nm to 560 nm range and a light emission peak with a FWHM of 90 nm or less in a 600 nm to 660 nm range when irradiating light including a 450 nm wavelength. When a light emission peak is in the above-mentioned wavelength range, and a green light emission peak has a FWHM of 50 nm or less and a red light emission peak has a FWHM of 90 nm or less, which are small, when irradiating light, high color gamut may be obtained. It is more favorable that the light emission peak has a smaller FWHM. For example, the red light emission peak more preferably has a FWHM of 70 nm or less. As a specific example, the red light emission peak more preferably has a FWHM of 70 nm or less in a 610 nm to 650 nm range.

In the present specification, the FWHM means a width of a light emission peak at a half of the maximum height in a maximum light emission peak of the light emitting from the color conversion film. The FWHM at light emission peak in the present specification may be measured in a film state.

According to one example, light having a light emission peak at a 450 nm wavelength may be used as the light including a 450 nm wavelength.

Specifically, blue light having a maximum light emission wavelength of 450 nm, a FWHM of 40 nm or less and monomodal light emission intensity distribution may be used in order to evaluate a light emission property such as a light emission peak or a FWHM of the organic fluorescent substance or the color conversion film.

In the present specification, blue light, green light and red light may use definitions known in the art, and for example, blue light is light having a wavelength selected from wavelengths of 400 nm to 500 nm, green light is light having a wavelength selected from wavelengths of 500 nm to 560 nm, and red light is light having a wavelength selected from wavelengths of 600 nm to 780 nm. In the present specification, a green fluorescent substance absorbs at least some of blue light and emits green light, and a red fluorescent substance absorbs at least some of blue light or green light and emits red light. For example, a red fluorescent substance may absorb light having a wavelength of 500 nm to 600 nm as well as blue light. As necessary, fluorescent substances emitting yellow light present between green light and red light wavelengths may also be used.

According to one embodiment of the present application, the green fluorescent substance is not particularly limited, and organic fluorescent substances including a pyrromethene metal complex series, an anthracene structure or a pyrene structure may be used. More specifically, organic fluorescent substances of the following structural formulae may be used.

According to one embodiment of the present application, pyrromethene metal complex series organic fluorescent substances may be used as the organic fluorescent substance.

According to one example, organic fluorescent substances of the following Chemical Formula 1 may be used.

[Chemical Formula 1]

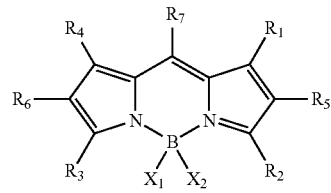

In Chemical Formula 1, $X_1$ and $X_2$ are a fluorine group or an alkoxy group, $R_1$ to $R_4$ are the same as or different from each other, and each independently hydrogen, a halogen group, an alkyl group, an alkoxy group, a carboxyl group-substituted alkyl group, an aryl group unsubstituted or substituted with an alkoxy group, —COOR or a —COOR-substituted alkyl group, and herein, R is an alkyl group, $R_5$ and $R_6$ are the same as or different from each other, and each independently hydrogen, a cyano group, a nitro group, an alkyl group, a carboxyl group-substituted alkyl group, —SO$_3$Na, or an aryl group unsubstituted or substituted with arylalkynyl, $R_1$ and $R_5$ may be linked to each other to form a substituted or unsubstituted hydrocarbon ring or a substituted or unsubstituted heteroring, and $R_4$ and $R_6$ may be linked to each other to form a substituted or unsubstituted hydrocarbon ring or a substituted or unsubstituted heteroring, and R₇ is hydrogen; an alkyl group; a haloalkyl group; or an aryl group unsubstituted or substituted with a halogen group, an alkyl group, an alkoxy group, an aryl group or an alkylaryl group.

According to one embodiment, $R_1$ to $R_4$ of Chemical Formula 1 are the same as or different from each other, and each independently hydrogen, a fluorine group, a chlorine group, an alkyl group having 1 to 6 carbon atoms, an alkoxy group having 1 to 6 carbon atoms, a carboxylic acid-substituted alkyl group having 1 to 6 carbon atoms, an aryl group having 6 to 20 carbon atoms unsubstituted or substituted with an alkoxy group having 1 to 6 carbon atoms, —COOR, or a —COOR-substituted alkyl group having 1 to 6 carbon atoms, and herein, R is an alkyl group having 1 to 6 carbon atoms.

According to another embodiment, $R_1$ to $R_4$ of Chemical Formula 1 are the same as or different from each other, and each independently hydrogen, a chlorine group, a methyl group, a carboxyl group-substituted ethyl group, a methoxy group, a phenyl group, a methoxy group-substituted phenyl group or a —COOR-substituted methyl group, and herein, R is an alkyl group having 1 to 6 carbon atoms.

According to one embodiment, $R_5$ and $R_6$ of Chemical Formula 1 are the same as or different from each other, and each independently hydrogen, a nitro group, an alkyl group having 1 to 6 carbon atoms, a carboxyl group-substituted alkyl group having 1 to 6 carbon atoms, or —SO₃Na.

According to one embodiment, $R_5$ and $R_6$ of Chemical Formula 1 are the same as or different from each other, and each independently hydrogen, a nitro group, an ethyl group, a carboxyl group-substituted ethyl group, or —SO₃Na.

According to one embodiment, $R_7$ of Chemical Formula 1 is hydrogen; an alkyl group having 1 to 6 carbon atoms; or an aryl group having 6 to 20 carbon atoms unsubstituted or substituted with an alkyl group having 1 to 6 carbon atoms, an alkoxy group having 1 to 6 carbon atoms, an aryl group having 6 to 20 carbon atoms or an alkylaryl group having 7 to 20 carbon atoms.

According to one embodiment, $R_7$ of Chemical Formula 1 is hydrogen, methyl, ethyl, propyl, butyl, pentyl, phenyl, methylphenyl, dimethylphenyl, trimethylphenyl, naphthyl, biphenyl-substituted naphthyl, dimethyl fluorene-substituted naphthyl, terphenyl-substituted dimethylphenyl, methoxyphenyl or dimethoxyphenyl. According to one embodiment, Chemical Formula 1 may be represented by the following structural formulae.

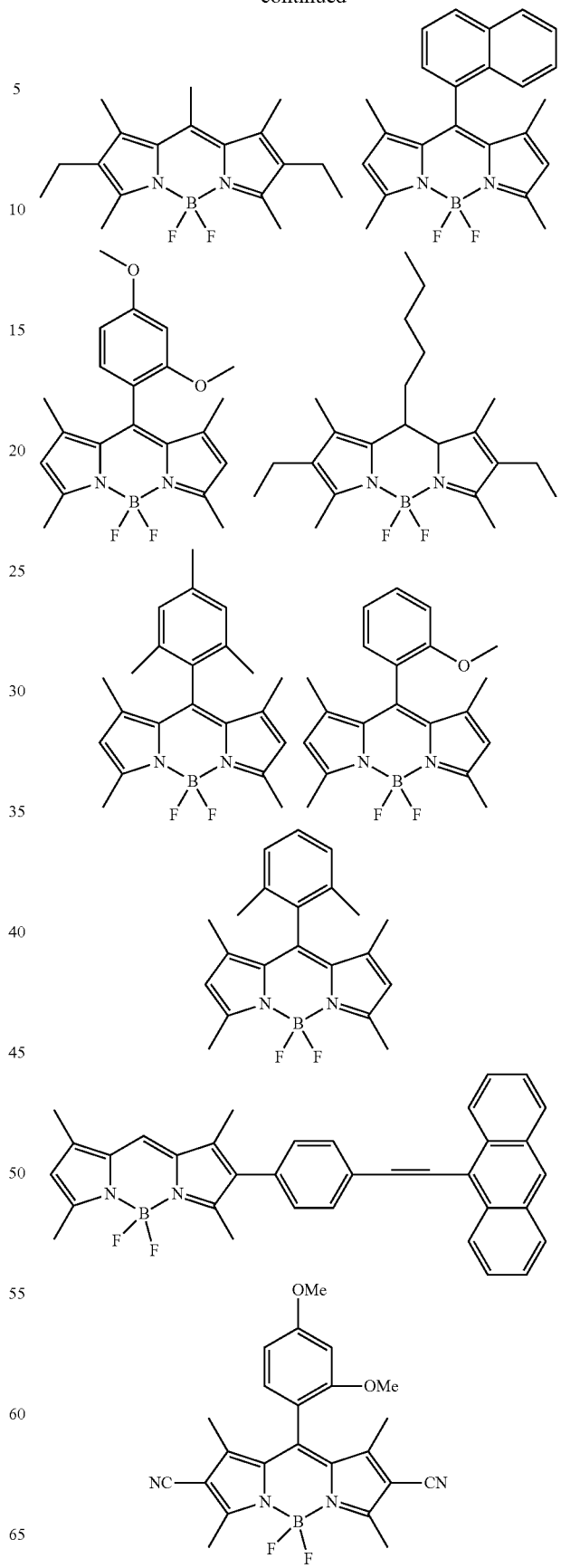

-continued
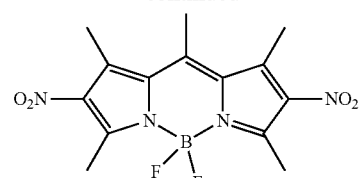
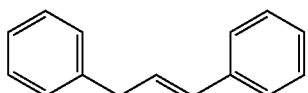
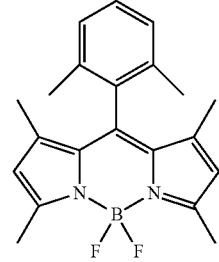
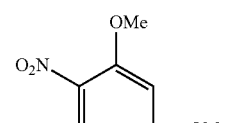
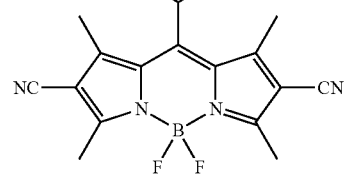
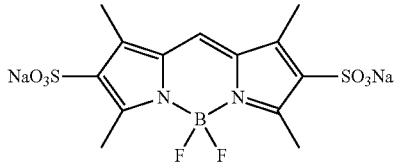
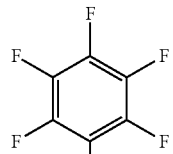
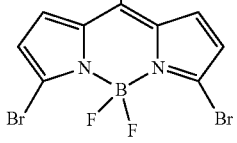
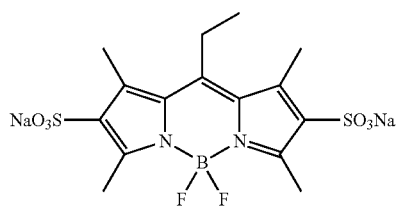
-continued
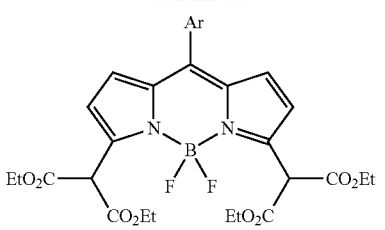
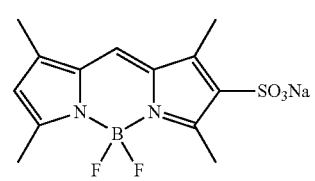
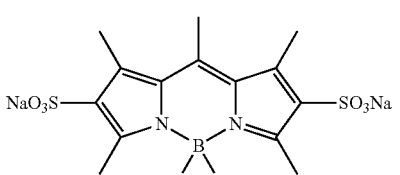
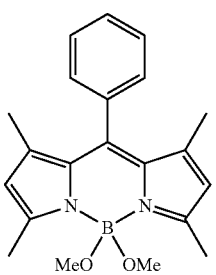
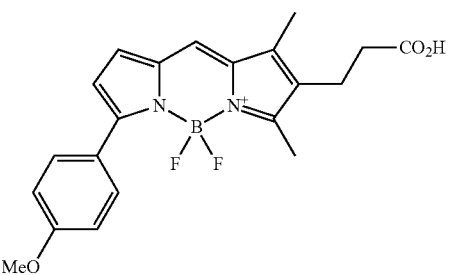
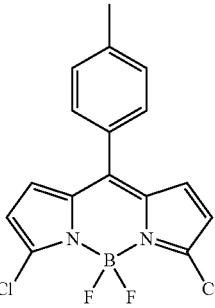
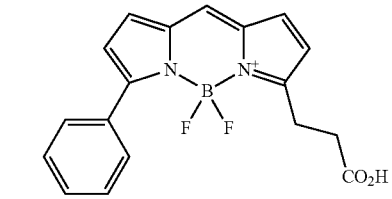

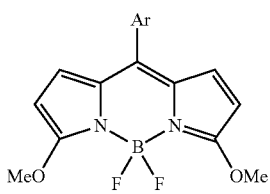

In addition to these, organic fluorescent substances including the following pyrromethene metal complex structure, anthracene structure or pyrene structure may be used as the green fluorescent substance.

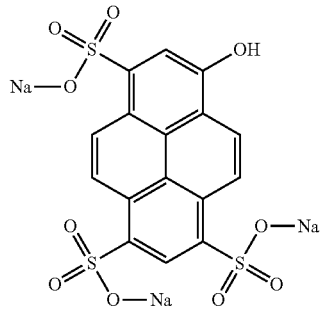

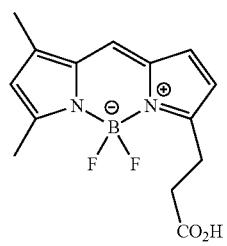

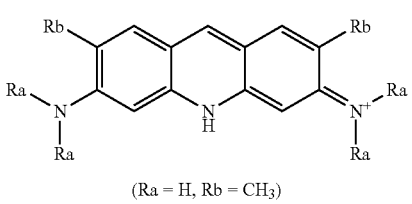

(Ra = H, Rb = $CH_3$)

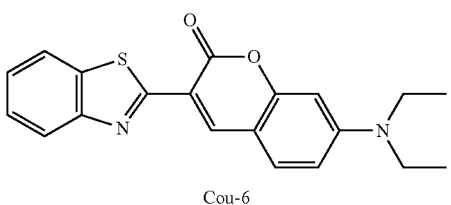

Cou-6

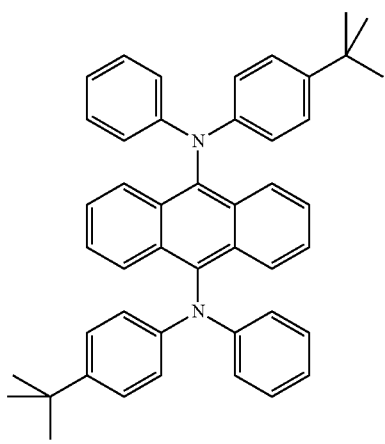

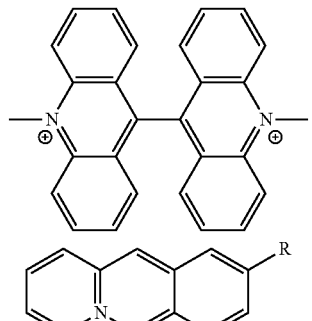

R = $NH_2$

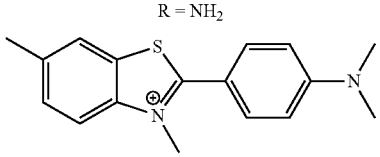

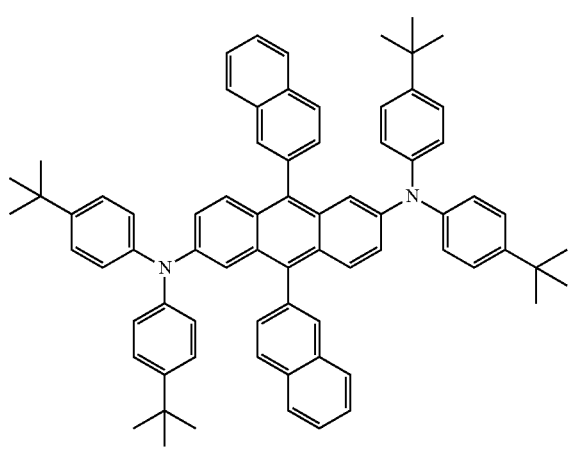

According to one embodiment of the present application, pyrromethene metal complex series, rhodamine series, DCM series or perylenedimide series fluorescent substances may be used as the red fluorescent substance.

According to another example, organic fluorescent substances having a maximum absorption wavelength at 560 nm to 620 nm and a light emission peak at 600 nm to 650 nm may be used as the red fluorescent substance. For example, compounds of the following Chemical Formula 2 may be used.

[Chemical Formula 2]

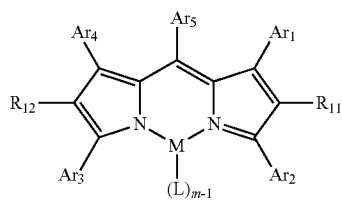

$R_{11}$, $R_{12}$ and L are the same as or different from each other, and each independently hydrogen, an alkyl group, a cycloalkyl group, an aralkyl group, an alkylaryl group, an alkenyl group, a cycloalkenyl group, an alkynyl group, a hydroxyl group, a mercapto group, an alkoxy group, an alkoxyaryl group, an alkylthio group, an arylether group, an arylthioether group, an aryl group, a haloaryl group, a heteroring group, halogen, a haloalkyl group, a haloalkenyl group, a haloalkynyl group, a cyano group, an aldehyde group, a carbonyl group, a carboxyl group, an ester group, a carbamoyl group, an amino group, a nitro group, a silyl group or a siloxanyl group, or are linked to adjacent substituents to form a substituted or unsubstituted aromatic or aliphatic hydrocarbon ring or heteroring, M is a metal having a valency of m, and is boron, berylium, magnesium, chromium, iron, nickel, copper, zinc or platinum, $Ar_1$ to $Ar_5$ are the same as or different from each other, and each independently hydrogen; an alkyl group; a haloalkyl group; an alkylaryl group; an amine group; an arylalkenyl group unsubstituted or substituted with an alkoxy group; or an aryl group unsubstituted or substituted with a hydroxyl group, an alkyl group or an alkoxy group.

According to one embodiment, Chemical Formula 2 may be represented by the following structural formulae.

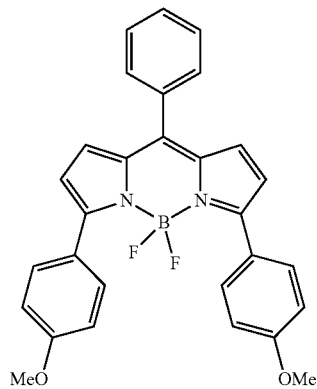

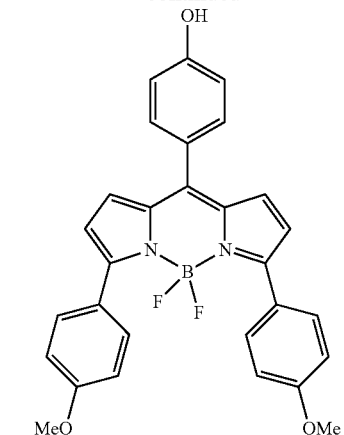

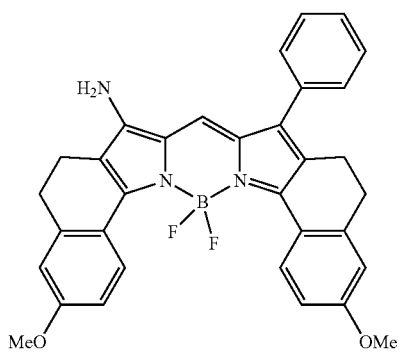

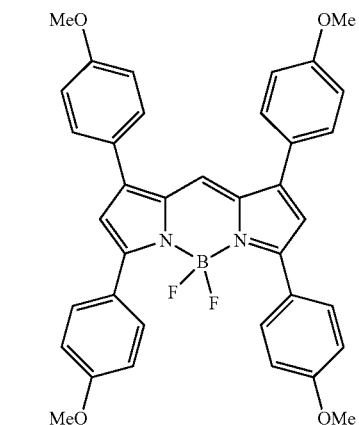

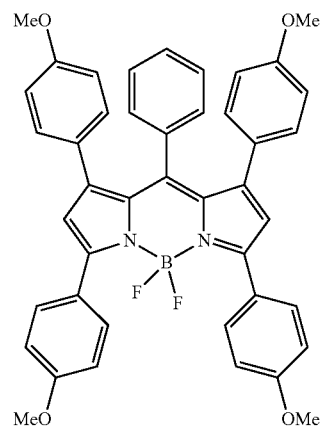

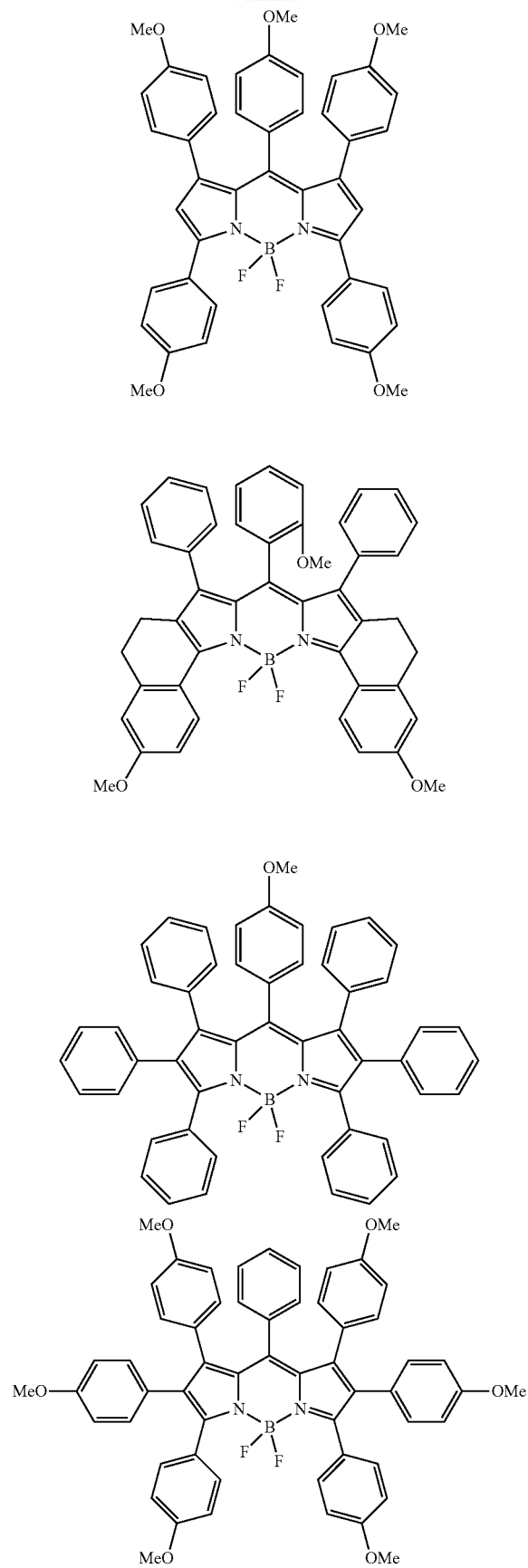

-continued

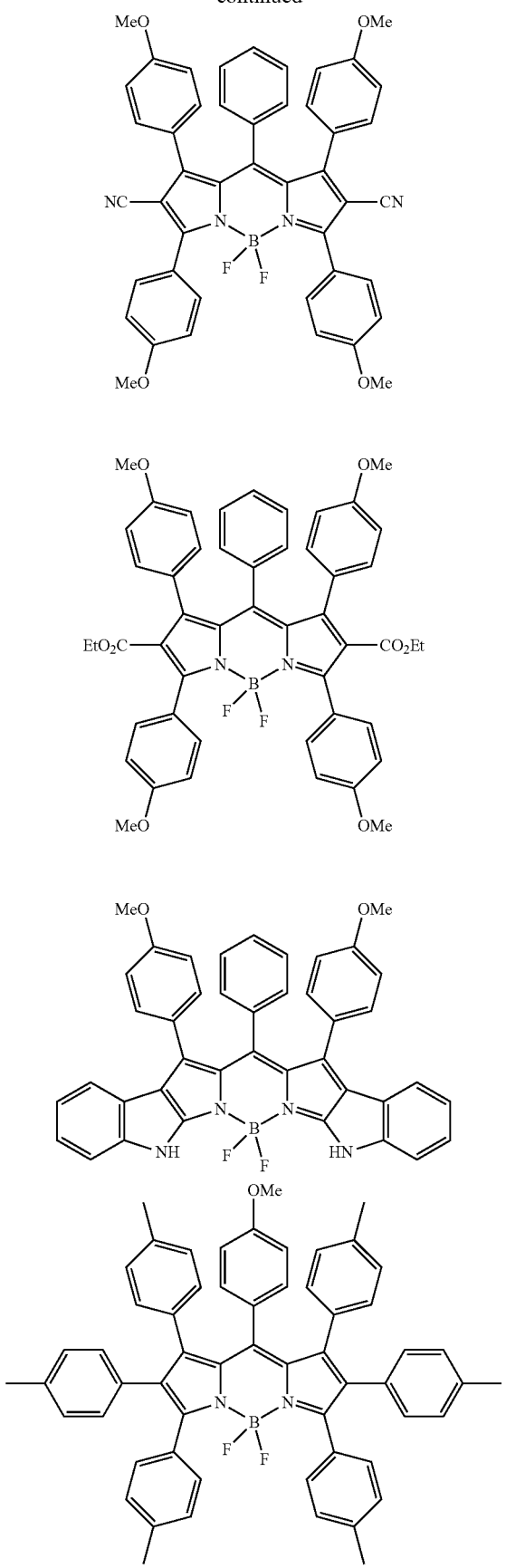

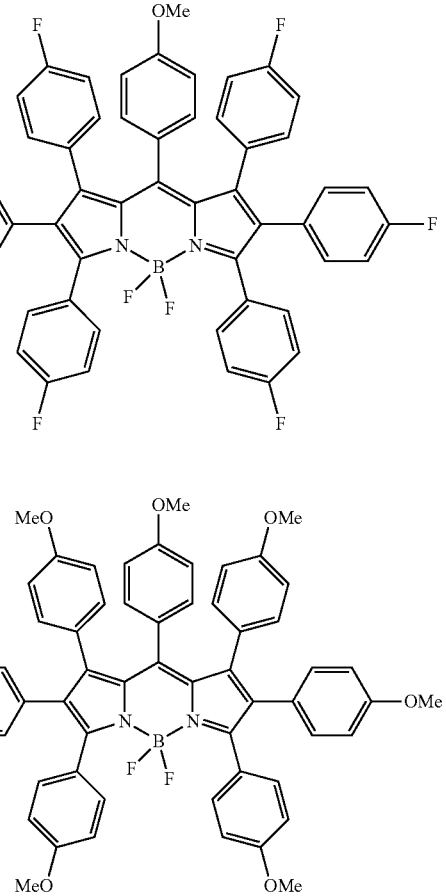

As the red fluorescent substance, compounds of the following Chemical Formula 3 may be used as the rhodamine series.

[Chemical Formula 3]

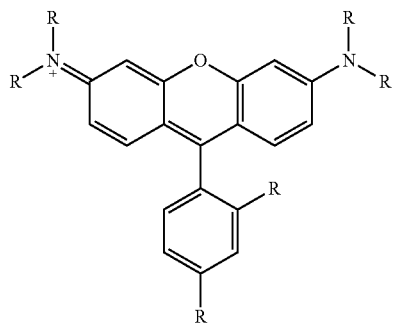

In Chemical Formula 3, Rs are the same as or different from each other, and are hydrogen; deuterium; COO—; a substituted or unsubstituted alkyl group; a substituted or unsubstituted alkoxy group; a substituted or unsubstituted aryl group; a substituted or unsubstituted aryloxy group. When R is further substituted, the substituent may be deuterium, an alkyl group, an alkoxy group, an aryl group or an aryloxy group.

As the red fluorescent substance, compounds of the following Chemical Formula 4 may be used as the DCM series.

[Chemical Formula 4]

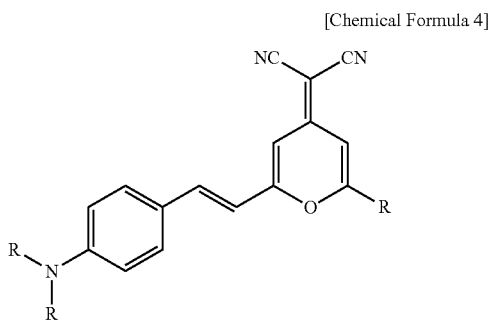

In Chemical Formula 4, Rs are the same as or different from each other, and are hydrogen; deuterium; a substituted or unsubstituted alkyl group; a substituted or unsubstituted alkoxy group; a substituted or unsubstituted aryl group; a substituted or unsubstituted aryloxy group. When R is further substituted, the substituent may be deuterium, an alkyl group, an alkoxy group, an aryl group or an aryloxy group.

As the red fluorescent substance, compounds of the following Chemical Formula 5 or 6 may be used as the perylenedimide series.

[Chemical Formula 5]

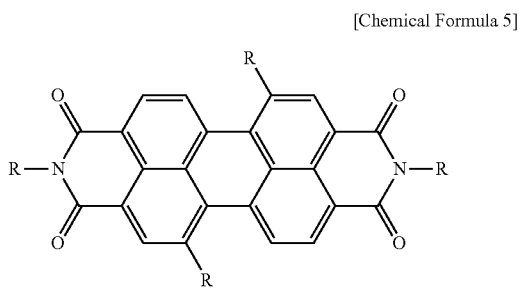

In Chemical Formula 5, Rs are the same as or different from each other, and are hydrogen; deuterium; a substituted or unsubstituted alkyl group; a substituted or unsubstituted alkoxy group; a substituted or unsubstituted aryl group; a substituted or unsubstituted aryloxy group. When R is further substituted, the substituent may be deuterium, an alkyl group, an alkoxy group, an aryl group or an aryloxy group.

[Chemical Formula 6]

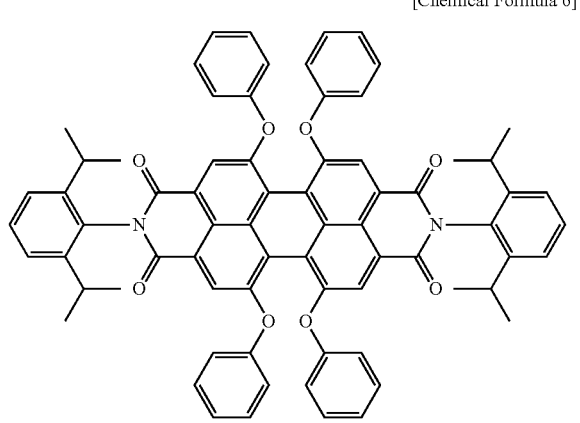

The green fluorescent substance may be included in 0.05 parts by weight to 2 parts by weight with respect to 100 parts by weight of the resin matrix. The red fluorescent substance may be included in 0.005 parts by weight to 2 parts by weight with respect to 100 parts by weight of the resin matrix.

The resin matrix material is preferably a thermoplastic polymer or a thermal curing polymer. Specifically, a poly(meth)acryl-based such as polymethyl methacrylate (PMMA), a polycarbonate (PC)-based, a polystyrene (PS)-based, a polyarylene (PAR)-based, a polyurethane (TPU)-based, a styrene-acrylonitrile (SAN)-based, a polyvinylidene fluoride (PVDF)-based, a modified polyvinylidene fluoride (modified-PVDF)-based and the like may be used as the resin matrix material.

According to another embodiment of the present application, the color conversion film according to the embodiments described above further includes light diffusing particles. By dispersing light diffusing particles instead of a light diffusing film used in the art into the color conversion film for enhancing luminance, higher luminance may be obtained as well as skipping an adhering process compared to a case of using a separate light diffusing film.

As the light diffusing particles, particles having a high refractive index with the resin matrix may be used, and examples thereof include $TiO_2$, silica, borosilicate, alumina, sapphire, air or other gases, air- or gas-filled hollow beads or particles (for example, air/gas-filled glass or polymer); polystyrene, polycarbonate, polymethyl methacrylate, acryl, methyl methacrylate, styrene, a melamine resin, a formaldehyde resin, or polymer particles including melamine and formaldehyde resins, or any suitable combination thereof.

The light diffusing particles may have particle diameters in a range of 0.1 micrometers to 5 micrometers. Content of the light diffusing particles may be determined as necessary, and for example, in a 1 parts by weight to 30 parts by weight range with respect to 100 parts by weight of solid of the resin matrix.

The color conversion film according to the embodiments described above may have a thickness of 2 micrometers to 200 micrometers, for example, 2 micrometers to 100 micrometers. Particularly, the color conversion film may exhibit high luminance even with a small thickness of 2 micrometers to 20 micrometers. This is due to the fact that the content of the fluorescent substance molecules included in the unit volume is higher compared to quantum dots.

The color conversion film according to the embodiments described above may have a substrate provided on one surface. This substrate may function as a support when preparing the color conversion film. Types of the substrate are not particularly limited, and the material or thickness is not limited as long as it is transparent and is capable of functioning as the support. Herein, transparency means having visible light transmittance of 70% or higher. For example, a PET film may be used as the substrate.

The color conversion film according to the embodiments described above may further include a protective film or a barrier film provided on at least one surface. An additional adhesive or gluing layer for adhering the protective film or the barrier film to the color conversion film may be provided.

The color conversion film described above may be prepared by coating a resin solution in which an organic fluorescent substance including the green fluorescent substance and the red fluorescent substance described above is dissolved on a substrate and drying the result, or by extruding and filming the organic fluorescent substance described above together with a resin.

The organic fluorescent substance described above is dissolved in the resin solution, and therefore, the organic fluorescent substance is uniformly distributed in the solution. This is different from a quantum dot film preparation process that requires a separate dispersion process.

The resin solution may further include light diffusing particles and a dispersion agent for dispersing the light diffusing particles as necessary.

As for the resin solution in which the organic fluorescent substance is dissolved, the preparation method is not particularly limited as long as the organic fluorescent substance and the resin described above are dissolved in the solution.

According to one example, the resin solution in which the organic fluorescent substance is dissolved may be prepared using a method of preparing a first solution by dissolving an organic fluorescent substance in a solvent, preparing a second solution by dissolving a resin in a solvent, and mixing the first solution and the second solution. When mixing the first solution and the second solution, it is preferable that these be uniformly mixed. However, the method is not limited thereto, and a method of simultaneously adding and dissolving an organic fluorescent substance and a resin, a method of dissolving an organic fluorescent substance in a solvent and subsequently adding and dissolving a resin, a method of dissolving a resin in a solvent and then subsequently adding and dissolving an organic fluorescent substance, and the like, may be used.

The organic fluorescent substance included in the solution includes the green fluorescent substance and the red fluorescent substance described above.

As the resin included in the solution, the resin matrix material described above, a monomer curable with this resin matrix resin, or a mixture thereof, may be used. For example, the monomer curable with the resin matrix resin includes a (meth)acryl-based monomer, and this may be formed to a resin matrix material by UV curing. When using such a curable monomer, an initiator required for curing may be further added as necessary.

The solvent is not particularly limited as long as it is capable of being removed by drying afterword while having no adverse effects on the coating process. Non-limiting examples of the solvent may include toluene, xylene, acetone, chloroform, various alcohol-based solvents, methylethyl ketone (MEK), methylisobutyl ketone (MIBK), ethyl acetate (EA), butyl acetate, dimethylformamide (DMF), dimethylacetamide (DMAc), dimethyl sulfoxide (DMSO), N-methyl-pyrrolidone (NMP), cyclohexanone, and the like, and one type or a mixture of two or more types may be used. When the first solution and the second solution are used, solvents included in each of the solutions may be the same as or different from each other. Even when different types of solvents are used in the first solution and the second solution, these solvents preferably has compatibility so as to be mixed with each other.

The process of coating the resin solution in which the organic fluorescent substance is dissolved on a substrate may use a roll-to-roll process. For example, a process of unwinding a substrate from a substrate-wound roll, coating the resin solution in which the organic fluorescent substance is dissolved on one surface of the substrate, drying the result, and then winding the result again on the roll may be carried out. When a roll-to-roll process is used, viscosity of the resin solution is preferably determined in a range capable of carrying out the process, and for example, may be determined in a range of 200 cps to 2,000 cps.

As the coating method, various known methods may be used, and for example, a die coater may be used, or various bar coating methods such as a comma coater and a reverse comma coater may be used.

After the coating, a drying process is carried out. The drying process may be carried out under a condition required to remove the solvent. For example, a color conversion film including a fluorescent substance having target thickness and concentration may be obtained on a substrate by carrying out the drying in an oven located close to a coater under a condition to sufficiently evaporate a solvent, in a direction of the substrate progressing during the coating process.

When a monomer curable with the resin matrix resin is used as the resin included in the solution, curing, for example, UV curing, may be carried out prior to or at the same time as the drying.

When the organic fluorescent substance is filmed by being extruded with a resin, extrusion methods known in the art may be used, and for example, the color conversion film may be prepared by extruding the organic fluorescent substance with a resin such as a polycarbonate (PC)-based, a poly(meth)acryl-based and a styrene-acrylonitrile (SAN)-based. For example, FIG. 8 illustrates one example. According to FIG. 8, the color conversion film according to the embodiments described above is provided on a surface of a light guide plate opposite to a surface facing a reflecting plate. FIG. 7 illustrates a constitution including a light source and a reflecting plate surrounding the light source, however, the structure is not limited thereto, and may be modified depending on back light unit structures known in the art. In addition, the light source may use a direct type as well as a side chain type, and a reflecting plate or a reflecting layer may not be included or replaced with other constituents as necessary, and when necessary, additional films such as a light diffusion film, a light concentrating film and a brightness enhancing film may be further provided.

In the constitution of a back light unit such as in FIG. 11, a scattering pattern may be provided as necessary on an upper or lower surface of the light guide plate. Light flowed into the light guide plate has non-uniform light distribution caused by the repetition of optical processes such as reflection, total reflection, refraction and penetration, and the scattering pattern may be used for inducing the non-uniform light distribution to uniform brightness.

According to another embodiment of the present application, a display apparatus including the back light unit described above is provided. The display apparatus is not particularly limited as long as it includes the back light unit described above as a constituent. For example, the display apparatus includes a display module and a back light unit. FIG. 12 illustrates a structure of the display apparatus. However, the structure is not limited thereto, and additional films such as a light diffusion film, a light concentrating film and a brightness enhancing film may be further provided as necessary between the display module and the back light unit.

Hereinafter, the present invention will be described in more detail with reference to examples.

EXAMPLE 1

A first solution was prepared by dissolving a green fluorescent substance and a red fluorescent substance of the following structural formulae in a xylene solvent in a molar ratio of 50:1.

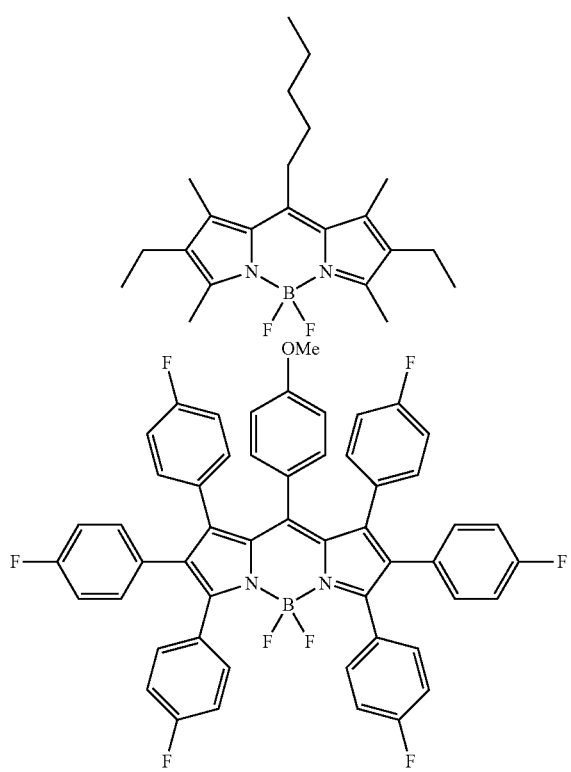

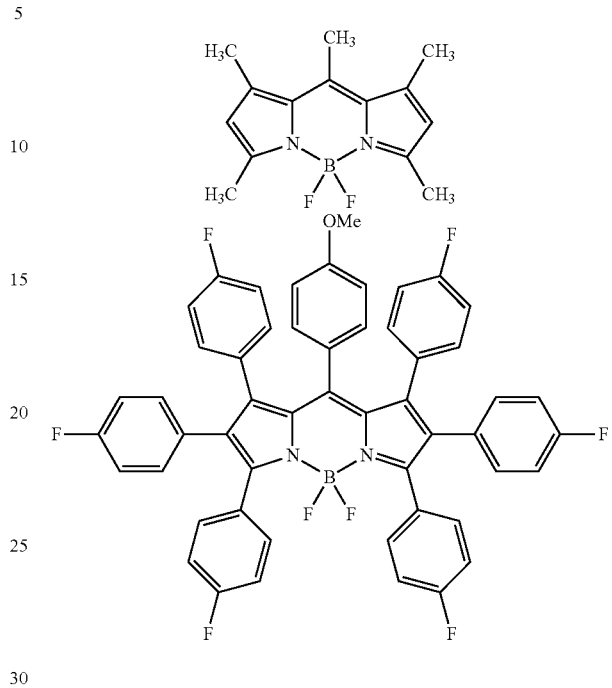

A second solution was prepared by dissolving a thermoplastic resin (PS) in a xylene solvent. The first solution and the second solution were mixed so that the content of the green and the red fluorescent substances became 0.45 parts by weight and the content of $TiO_2$ particles became 10 parts by weight with respect to 100 parts by weight of the thermoplastic resin, and were uniformly mixed. This solution was coated on a PET substrate, and the result was dried to prepare a color conversion film. A light emission spectrum of the prepared color conversion film was measured using a spectroradiometer (TOPCON Corporation SR series). Specifically, the prepared color conversion film was laminated on one surface of a light guide plate of a back light unit including an LED blue back light (maximum light emission wavelength 450 nm) and the light guide plate, and after laminating a prism sheet and a DBEF film on the color conversion film, a luminance spectrum of the film was measured, and the result is shown in FIG. 3. According to FIG. 3, in the prepared color conversion film, green light emission had a maximum light emission wavelength of 540 nm and a FWHM of 36 nm, and red light emission had a maximum light emission wavelength of 615 nm and a FWHM of 53 nm, and high color gamut of 140% based on a sRGB area ratio was able to be obtained.

EXAMPLE 2

Preparation was carried out in the same manner as in Example 1 except that the green fluorescent substance and the red fluorescent substance of the following structural formulae had a molar ratio of 30:1. A light emission spectrum of the prepared color conversion film was measured and the result is shown in FIG. 4. According to FIG. 4, in the prepared color conversion film, green light emission had a maximum light emission wavelength of 530 nm and a FWHM of 33 nm, and red light emission had a maximum light emission wavelength of 615 nm and a FWHM of 48 nm, and high color gamut of 138% based on a sRGB area ratio was able to be obtained.

EXAMPLE 3

Preparation was carried out in the same manner as in Example 1 except that TRR170 of Toray Industries, Inc. was used as the red fluorescent substance, and the molar ratio was 22:1. A light emission spectrum of the prepared color conversion film was measured and the result is shown in FIG. 5. According to FIG. 5, in the prepared color conversion film, green light emission had a maximum light emission wavelength of 540 nm and a FWHM of 33 nm, and red light emission had a maximum light emission wavelength of 635 nm and a FWHM of 51 nm, and high color gamut of 151% based on a sRGB area ratio was able to be obtained.

EXAMPLE 4

Preparation was carried out in the same manner as in Example 2 except that TRR170 of Toray Industries, Inc. was used as the red fluorescent substance, and the molar ratio was 9:1. A light emission spectrum of the prepared color conversion film was measured and the result is shown in FIG. 6. According to FIG. 6, in the prepared color conversion film, green light emission had a maximum light emission wavelength of 530 nm and a FWHM of 29 nm, and red light emission had a maximum light emission wavelength of 637 nm and a FWHM of 50 nm, and high color gamut of 158% based on a sRGB area ratio was able to be obtained.

COMPARATIVE EXAMPLE 1

Preparation was carried out in the same manner as in Example 4 except that the green fluorescent substance and the red fluorescent substance had a molar ratio of 60:1. A light emission spectrum of the prepared color conversion film was measured and the result is shown in FIG. 7.

COMPARATIVE EXAMPLE 2

Preparation was carried out in the same manner as in Example 4 except that the green fluorescent substance and the red fluorescent substance had a molar ratio of 2.5:1. A light emission spectrum of the prepared color conversion film was measured and the result is shown in FIG. 8.

COMPARATIVE EXAMPLE 3

Preparation was carried out in the same manner as in Example 3 except that a film including the green fluorescent substance and a film including the red fluorescent substance were separately prepared and then laminated. In Comparative Example 3, the green fluorescent substance film and the red fluorescent substance film were separately prepared using the same molar number as in Example 3. A light emission spectrum of the prepared color conversion film was measured and the result is shown in FIG. 9.

COMPARATIVE EXAMPLE 4

A coating solution was prepared by adding 40 parts by weight of a green inorganic fluorescent substance (MW540) and 25 parts by weight of a red inorganic fluorescent substance (RE660ZMD) instead of the organic fluorescent substance to an acryl-based UV resin, and the result was uniformly mixed. This solution was coated on a PET substrate, and the result was UV cured to prepare a color conversion film. A light emission spectrum of the prepared color conversion film was measured and the result is shown in FIG. 10. According to FIG. 10, in the prepared color conversion film, green light emission had a maximum light emission wavelength of 540 nm and a FWHM of 53 nm, and red light emission had a maximum light emission wavelength of 648 nm and a FWHM of 102 nm.

The following Table 1 shows color coordinates, color gamut and luminance of the examples and the comparative examples.

TABLE 1

|  | Wx/Wy | Luminance (nit) | Color Gamut (%) sRGB-Based Area Ratio |
|---|---|---|---|
| Example 1 | 0.30/0.31 | 307 | 140 |
| Example 2 | 0.29/0.33 | 298 | 138 |
| Example 3 | 0.31/0.30 | 262 | 151 |
| Example 4 | 0.29/0.29 | 220 | 158 |
| Comparative Example 1 | 0.28/0.38 | 357 | 137 |
| Comparative Example 2 | 0.32/0.14 | 65 | 176 |
| Comparative Example 3 | 0.28/0.37 | 347 | 140 |
| Comparative Example 4 | 0.28/0.33 | 241 | 135 |

According to Table 1, it can be seen that color gamut of Examples 1 to 4 is very high considering that color gamut of a white LED (W-LED) using a YAG fluorescent substance is 122%. Particularly, excellent luminance was obtained in Examples 1 to 4, and color coordinates in a target color coordinate (Wx 0.27-0.33, Wy 0.28-0.34) range were exhibited. Comparative Examples 1 to 3 all had values outside a target color coordinate range.

When films each including a green fluorescent substance and a red fluorescent substance are prepared and laminated as in Comparative Example 3, absorption efficiency of the red fluorescent substance decreases, and a larger quantity of the red fluorescent substance needs to be used compared to when preparing a film my mixing the green fluorescent substance and the red fluorescent substance as in Examples 1 to 4. In Example 4, the process was simpler compared to the film lamination in Comparative Example 3, and an equal level of color gamut was able to be obtained with a smaller quantity of the red fluorescent substance.

When the light emission peak in a 510 nm to 560 nm range had a FWHM of 50 nm or greater, and the light emission peak in a 610 nm to 660 nm range had a FWHM of 80 nm or greater as in Comparative Example 4, color gamut decreased compared to Examples 1 to 4.

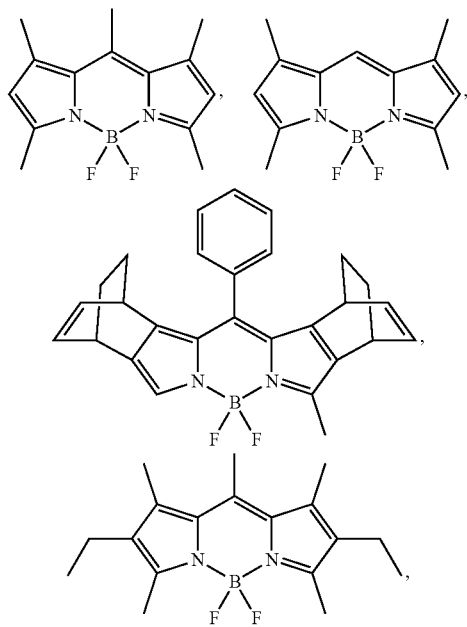

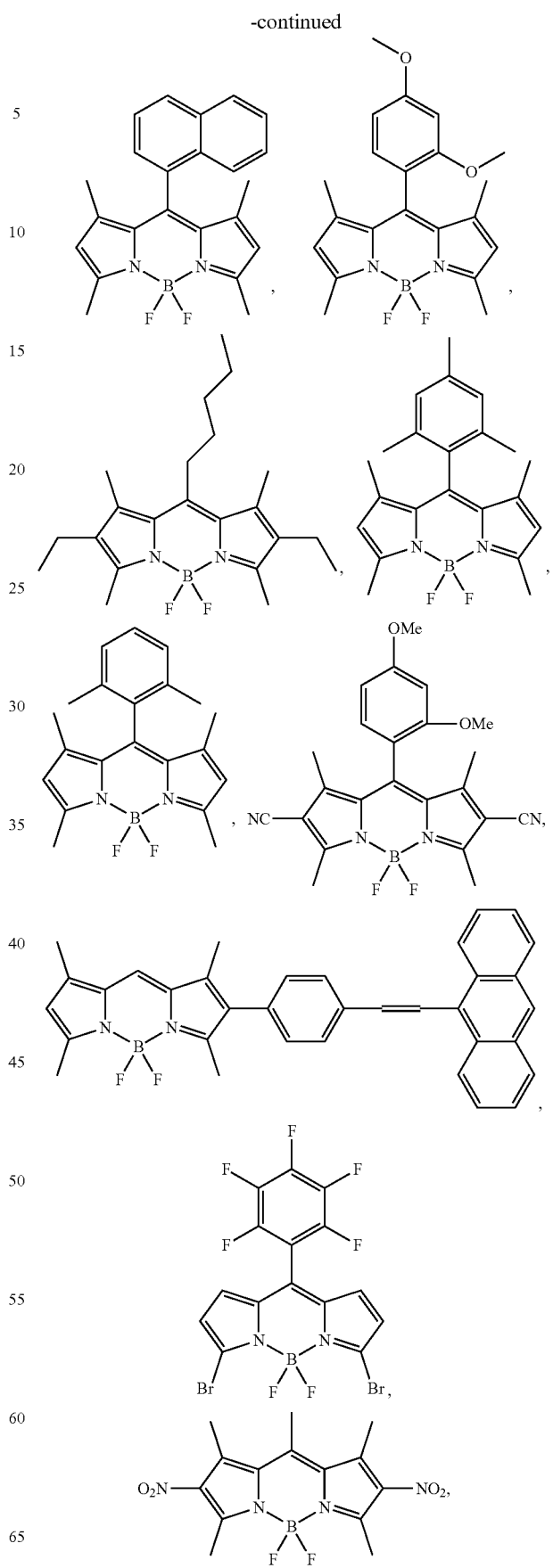

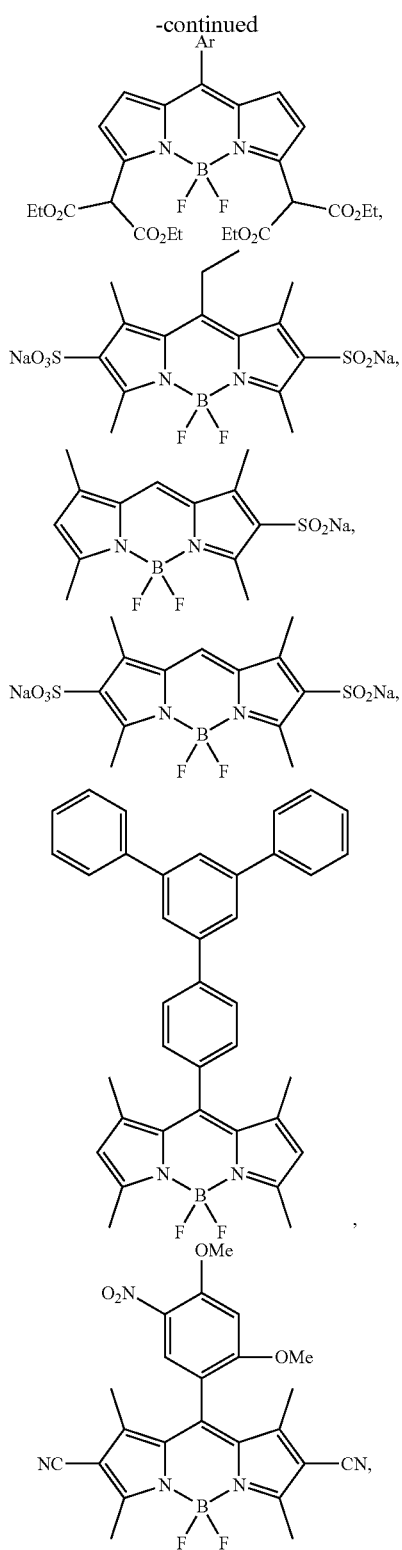
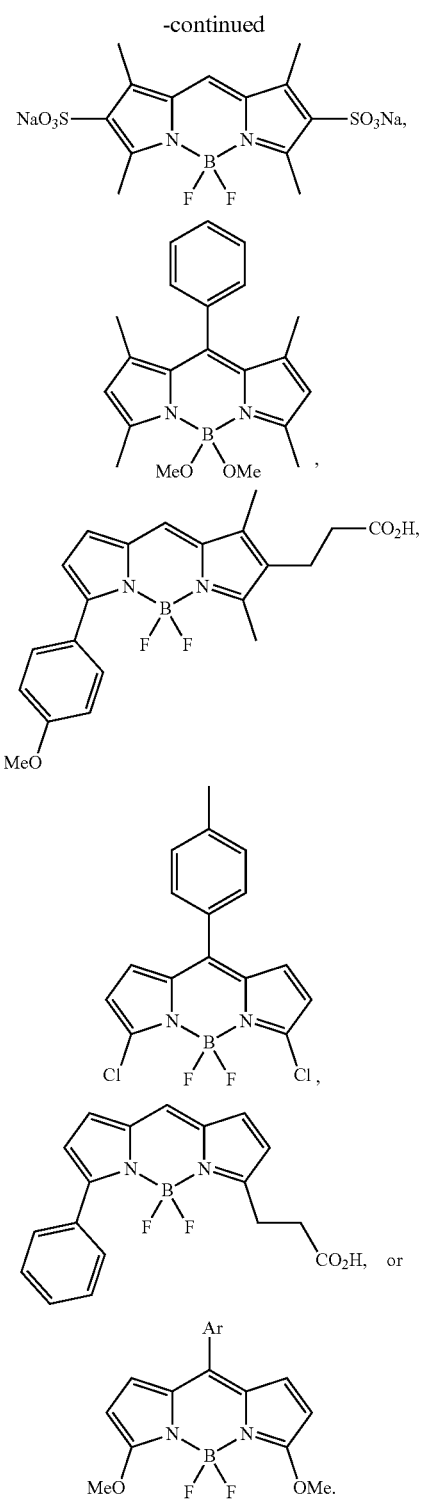

The invention claimed is:

1. A color conversion film comprising:
a resin matrix; and
an organic fluorescent substance comprising a pyrromethene metal complex dispersed in the resin matrix,
wherein the organic fluorescent substance includes a green fluorescent substance having a maximum light emission wavelength in a 510 nm to 560 nm range when irradiating light including a 450 nm wavelength, and a red fluorescent substance having a maximum light emission wavelength in a 600 nm to 660 nm range when irradiating light including a 450 nm wavelength, the green fluorescent substance and the red fluorescent substance have a molar ratio of 5:1 to 50:1, and the color conversion film has a light emission peak with a full width at half maximum (FWHM) of 50 nm or less in a 510 nm to 560 nm range and a light emission peak with a FWHM of 90 nm or less in a 600 nm to 660 nm range when irradiating light.

2. The color conversion film of claim 1, which has a light emission peak with a FWHM of 70 nm or less in a 610 nm to 650 nm range.

3. The color conversion film of claim 1, wherein the light including a 450 nm wavelength uses light having a light emission peak at a 450 nm wavelength.

4. The color conversion film of claim 1, wherein the light including a 450 nm wavelength uses blue light having a maximum light emission wavelength of 450 nm, a FWHM of 40 nm or less and monomodal light emission intensity distribution.

5. The color conversion film of claim 1, wherein the green fluorescent substance and the red fluorescent substance are included in a single layer.

6. A method for preparing the color conversion film of claim 1, the method comprising:
coating a resin solution in which a green fluorescent substance having a maximum light emission wavelength in a 510 nm to 560 nm range when irradiating light including a 450 nm wavelength, and a red fluorescent substance having a maximum light emission wavelength in a 600 nm to 660 nm range when irradiating light including a 450 nm wavelength are dissolved on a substrate; and
drying the resin solution coated on the substrate.

7. A method for preparing the color conversion film of claim 1, the method comprising extruding a fluorescent substance having a maximum light emission wavelength in a 510 nm to 560 nm range when irradiating light including a 450 nm wavelength, and a fluorescent substance having a maximum light emission wavelength in a 600 nm to 660 nm range when irradiating light including a 450 nm wavelength with a resin.

8. A backlight unit comprising the color conversion film of claim 1.

9. A display apparatus comprising the backlight unit of claim 8.

10. The color conversion film of claim 1, wherein the pyrromethene metal complex is represented by Chemical Formula 1

[Chemical Formula 1]

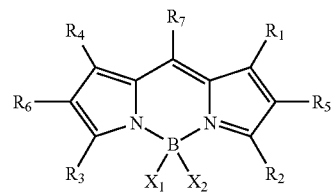

wherein $X_1$ and $X_2$ are a fluorine group or an alkoxy group;

$R_1$ to $R_4$ are the same or different from each other, and each independently hydrogen, a halogen group, an alkyl group, an alkoxy group, a carboxyl group-substituted alkyl group, an aryl group unsubstituted or substituted with an alkoxy group, —COOR or a —COOR-substituted alkyl group, and herein, R is an alkyl group;

$R_5$ and $R_6$ are the same or different from each other, and each independently hydrogen, a cyano group, a nitro group, an alkyl group, a carboxyl group-substituted alkyl group, $SO_3Na$, or an aryl group unsubstituted or substituted with arylalkynyl, $R_1$ and $R_5$ may be linked to each other to form a substituted or unsubstituted hydrocarbon ring or a substituted or unsubstituted heteroring, and $R_4$ and $R_6$ may be linked to each other to form a substituted or unsubstituted hydrocarbon ring or a substituted or unsubstituted heteroring; and $R_7$ is hydrogen, an alkyl group, a haloalkyl group, or an aryl group unsubstituted or substituted with a halogen group, an alkyl group, an alkoxy group, an aryl group or an alkylaryl group.

11. The color conversion film of claim 10, wherein the Chemical Formula 1 is: